(12) United States Patent
Kvamsdal et al.

(10) Patent No.: US 10,086,385 B2
(45) Date of Patent: *Oct. 2, 2018

(54) INLET DEVICE FOR GRAVITY SEPARATOR

(71) Applicant: Cameron Systems AS, Trondheim (NO)

(72) Inventors: Dag Kvamsdal, Trandheim (NO); Knut Sveberg, Trondheim (NO); Mauritz Talseth, Trondheim (NO)

(73) Assignee: Cameron Systems AS, Trondheim (NO)

( * ) Notice: Subject to any disclaimer, the term of this patent is extended or adjusted under 35 U.S.C. 154(b) by 173 days.

This patent is subject to a terminal disclaimer.

(21) Appl. No.: 15/046,191

(22) Filed: Feb. 17, 2016

(65) Prior Publication Data

US 2016/0236211 A1 Aug. 18, 2016

Related U.S. Application Data

(63) Continuation of application No. 13/877,400, filed as application No. PCT/NO2011/000252 on Sep. 15, 2011, now Pat. No. 9,266,042.

(30) Foreign Application Priority Data

Oct. 8, 2010 (NO) .................................. 20101393

(51) Int. Cl.
*B01D 45/08* (2006.01)
*B04C 3/06* (2006.01)
(Continued)

(52) U.S. Cl.
CPC ............. *B04C 3/06* (2013.01); *B01D 19/0057* (2013.01); *B01D 45/08* (2013.01); *B01D 45/16* (2013.01);
(Continued)

(58) Field of Classification Search
CPC ................ B01D 46/0023; B01D 45/16; B01D 46/0002; B01D 46/0005; B01D 46/521; B01D 19/0057; B04C 3/04; B04C 3/06
See application file for complete search history.

(56) References Cited

U.S. PATENT DOCUMENTS 2,372,514 A 3/1945 Pootjes
4,591,367 A 5/1986 Pek et al.
(Continued)

FOREIGN PATENT DOCUMENTS

EP 1987871 5/2008
GB 2329857 7/1999
(Continued)

*Primary Examiner* — Dung H Bui
(74) *Attorney, Agent, or Firm* — Gable Gotwals

(57) ABSTRACT

An inlet device (17) for a separator (18) for separating a fluid mixture including gas and liquid. The inlet device (17) includes an inlet nozzle (1) for the fluid mixture, a distribution chamber (2) connected to the inlet nozzle for distributing the fluid mixture to one or more axial cyclones (3) constituting an integral part of the inlet device (17) and being connected to the distribution chamber (2). The axial cyclones (3) are provided with an outlet opening (9) for the gas rich fluid stream, a swirl inducing element (21), one or more openings (24) to allow the liquid-rich stream exiting the openings (24) of the axial cyclones (3) as well as liquid separating from a gas-rich stream exiting the outlet opening (9) to be drained to a level below the inlet device (17).

14 Claims, 11 Drawing Sheets

(51) Int. Cl.
    *B01D 46/00*     (2006.01)
    *B01D 45/16*     (2006.01)
    *B01D 46/52*     (2006.01)
    *B04C 3/04*     (2006.01)
    *B01D 19/00*     (2006.01)

(52) U.S. Cl.
    CPC ..... *B01D 46/0002* (2013.01); *B01D 46/0005* (2013.01); *B01D 46/0023* (2013.01); *B01D 46/521* (2013.01); *B04C 3/04* (2013.01)

(56) References Cited

U.S. PATENT DOCUMENTS

| | | |
|---|---|---|
| 2007/0044437 A1 | 3/2007 | Lamholm et al. |
| 2008/0168753 A1 | 7/2008 | Christiansen et al. |
| 2009/0196806 A1* | 8/2009 | Larnholm ............ B01D 45/12 422/269 |

FOREIGN PATENT DOCUMENTS

| | | |
|---|---|---|
| NO | 175569 | 6/1991 |
| NO | 321170 | 12/2003 |
| WO | 97/49477 | 12/1997 |
| WO | 00/25931 | 5/2000 |
| WO | 03/039755 | 5/2003 |
| WO | 2006/132527 | 12/2006 |

* cited by examiner

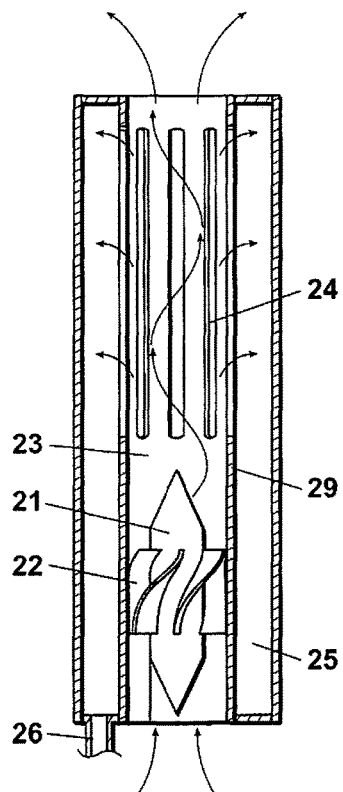
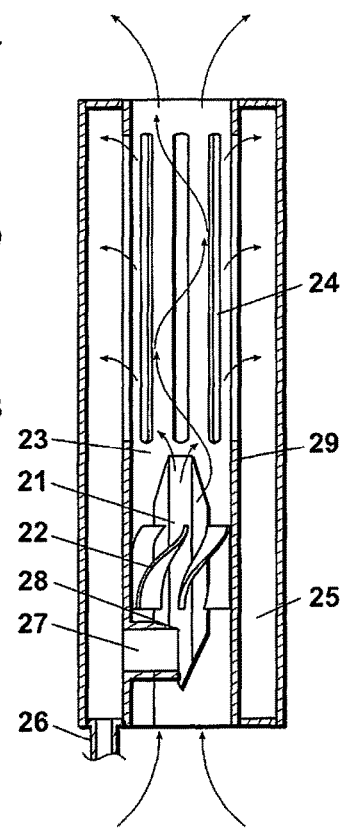
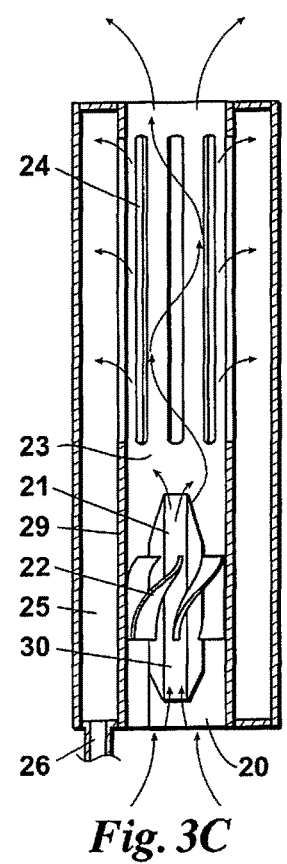
*Fig. 3A*
*Fig. 3B*
*Fig. 3C*

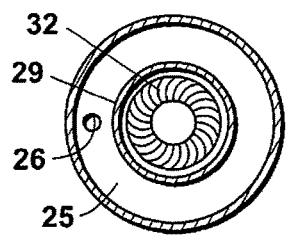
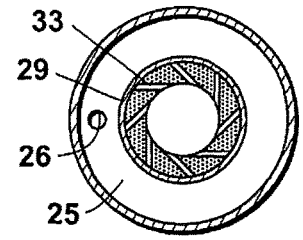
*Fig. 3D'*   *Fig. 3E'*
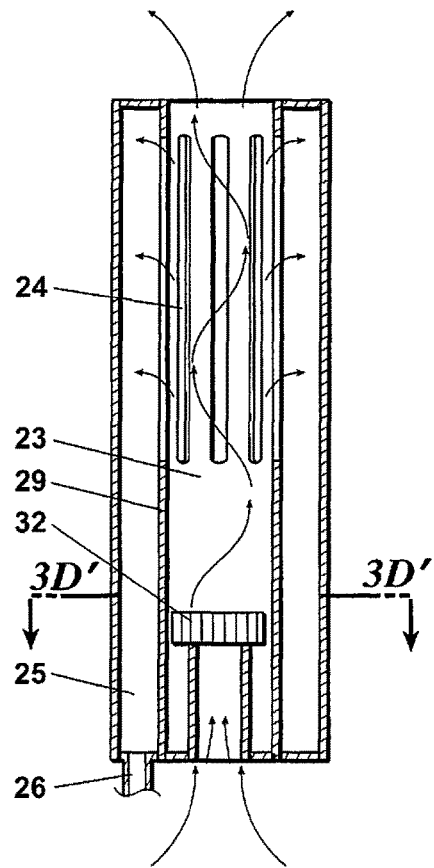
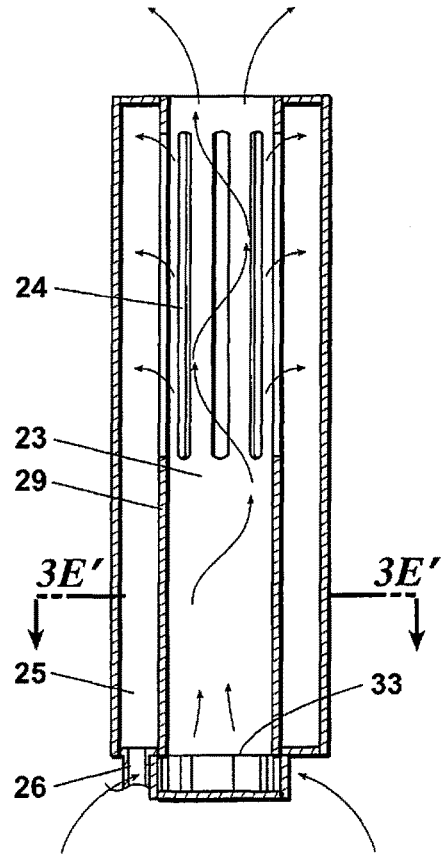
*Fig. 3D*   *Fig. 3E*

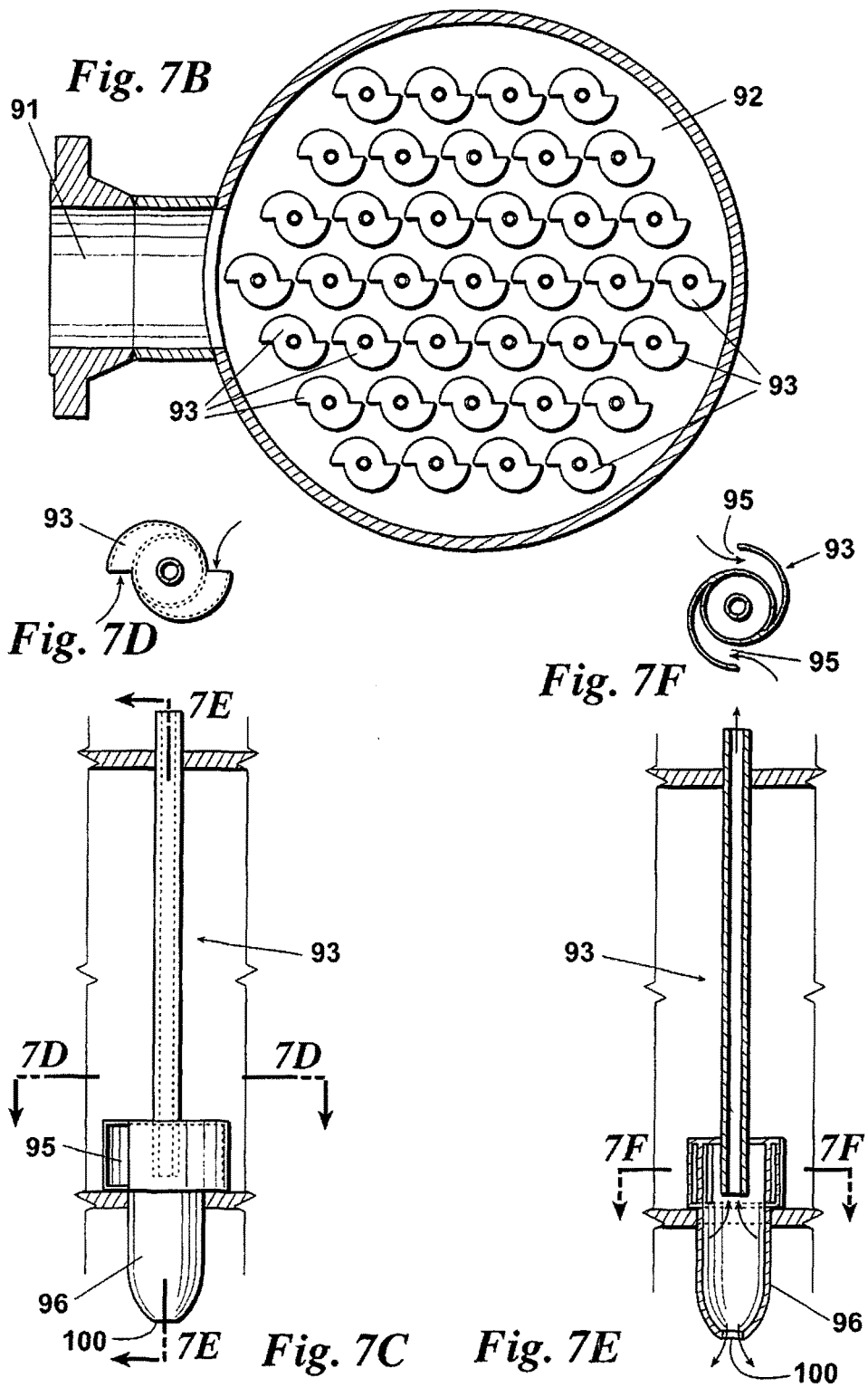

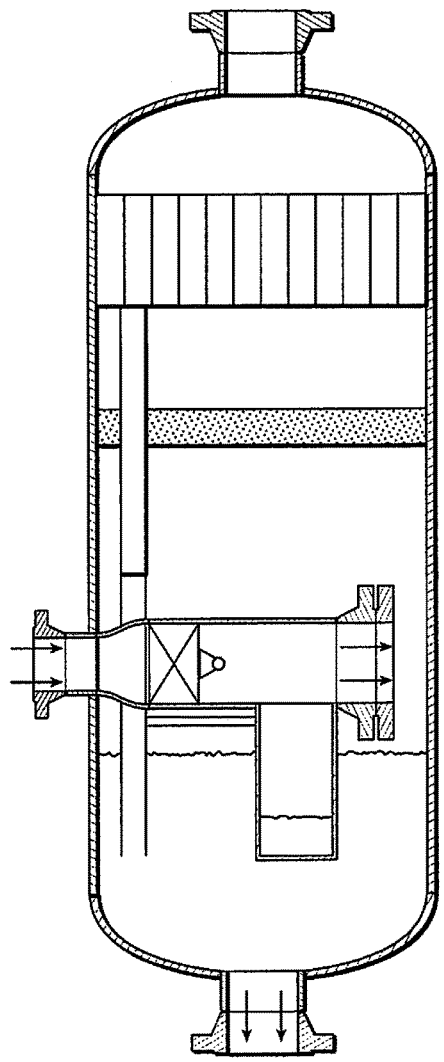 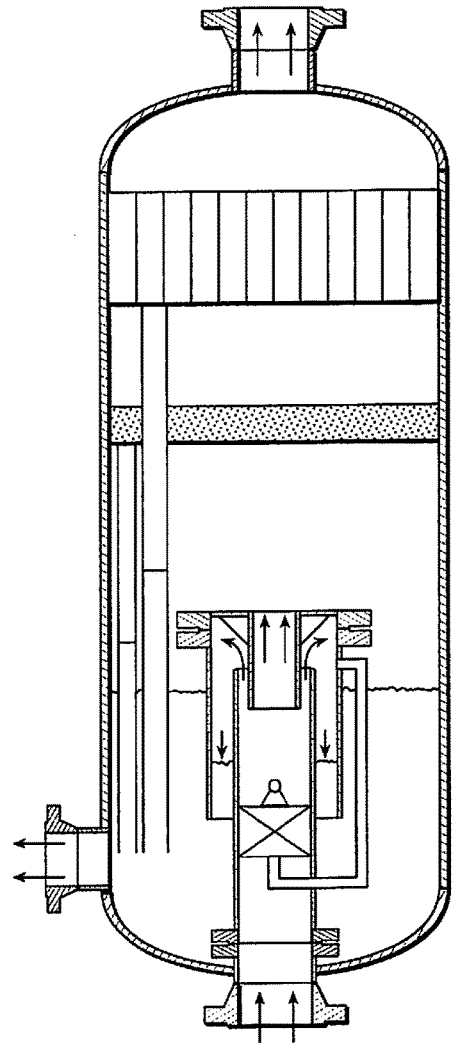
*Fig. 8A*  *Fig. 8B*

INLET DEVICE FOR GRAVITY SEPARATOR

CROSS-REFERENCE TO RELATED APPLICATIONS

This application is a continuation application which claims priority to U.S. patent application Ser. No. 13/877,400 filed on Apr. 26, 2013, which was a National Phase of PCT Patent Application No. NO2011/000252 filed on 15 Sep. 2011, which claimed priority to Norwegian Patent Application No. 20101393 filed 8 Oct. 2010, which are incorporated herein by reference.

BACKGROUND OF THE INVENTION

The present invention relates to separation of liquid droplets from a gas stream, particularly in production of oil and gas. More precisely, the present invention relates to an inlet device intended for use in gravity separators designed typically for the removal of liquid droplets from a gas stream.

During production of oil and gas from a subterranean reservoir, the well stream will normally contain oil, gas, water and some solid particles. In order to separate the various fluids and solids, a dedicated process system for the well stream is constructed. The separation is made in several stages, where the "bulk separation" of the various phases is carried out by gravity forces alone where the immiscible fluids are separated based on difference in densities, and the "fine separation" or purification is often done utilizing centrifugal forces and inertial forces together with the gravity force.

A challenge appearing in many separation stages is to remove liquid droplets from a gas stream where the liquid content in the gas is low, typically less than 3 vol % of the total volumetric flow. It is of outmost importance to remove most of this liquid in order to protect downstream equipment such as compressors and dewatering equipment where only traces of liquid may create operational problems.

In the following, separators dedicated to separate gas/liquid mixtures containing less than said 3 vol % liquid is denoted gas scrubbers.

The gas scrubbers will often be a vertical vessel but may also be a horizontal vessel or a combination of a vertical and horizontal vessel. Inside the gas scrubber vessel, the separation often takes place in several stages. First, the gas enters through an inlet nozzle, which—for vertical oriented scrubbers—can be located approximately at the middle of the scrubber in the vertical direction. At the inlet nozzle a momentum breaker plate, a vane diffuser or any device can be located in order to distribute fluids across the separator cross-sectional area. Already here, the largest drops are separated and falling down onto the liquid reservoir in the lower part of the separator.

The gas will flow upwards into a calm zone, or deposition zone, where further droplets due to gravity falls down onto the liquid surface below, alternatively deposits on the separator wall and drain downwards along this.

Close to the top of the separator, the gas is forced to pass through droplet separation equipment of known technology. There are mainly three categories of droplet separation equipment; mesh pad, vanepack and parallel arranged axial flow cyclones. Because of the pressure drop across the droplet separation equipment, the separated liquid is normally drained down to the liquid reservoir through a said drainpipe, whose lower end is submerged in the liquid reservoir.

It is important that the separator inlet device is correctly designed relatively to the separator cross sectional area in order to remove as much liquid as possible to minimize the amount of liquid fed to the demisting equipment. This is particularly important for vertical scrubbers and contactor columns utilized to remove aqueous vapor from a gas stream. Too much liquid fed to the demisting equipment caused by poorly designed inlet devices and/or too small scrubber diameters relative to the gas flow rate are the main reasons for malfunction experienced on a large number of scrubber installations. Most inlet devices of known technology uses gravity forces alone to separate liquid in the scrubber inlet compartment, giving stringent limits to the gas velocities before considerable amounts of liquid is following the gas to the demisting equipment. Inlet cyclones have successfully replaced earlier used inlet devices in modern 2- and 3-phase separators where the liquid content is high, typically above 5 vol %, but inlet devices described as vane diffusers still represents state of the art technology in vertical gas scrubbers where the liquid fraction is less than 3 vol %. Lately, cyclone inlet devices are also applied in gas scrubbers. However, some operational problems associated with cyclone inlet devices used in gas scrubbers will be explained in the following.

A more thorough description of the prior art is given in the specific part of the description with reference to drawings.

SUMMARY OF THE INVENTION

The objective of the present invention is to provide a more efficient inlet device for a gravity separator or gas scrubber for separating a fluid mixture comprising gas and liquid, in order to enhance the overall efficiency of the separator or scrubber.

The above mentioned object is fulfilled with the present invention, which is an inlet device as defined by claim 1. Preferred embodiments of the invention are disclosed by the dependent claims. The scrubber vessel will typically be a vertical gravity separator but may also be a horizontal vessel or a combination of a horizontal and a vertical vessel typically comprising:

- a vessel that has an upper gas filled compartment and a lower liquid filled compartment;
- an inlet section usually designed to reduce the inlet momentum from the pipe into the vessel and assure a good flow distribution in the vessel, there are inlet sections that aim to do pre separation of liquid from gas in addition and the present invention represent such a device;
- an agglomerator unit placed between the inlet section and the last treating section used to increase the droplet size and improve the gas and liquid distribution into the last treating stage in the vessel;
- a demister treating stage for removal of the traces of liquid in the downcomer pipe for transporting the liquid removed in the last treating device back to the lower liquid filled section of the vessel;
- a lower outlet opening for discharging the substantially liquid-containing mixture part from the lower compartment; and
- an upper outlet opening for discharging the substantially gas-containing mixture part from the upper compartment.

The new invention will be the inlet section in the scrubber vessel and will be designed as a pretreatment stage that should be able to remove the major part of the liquid. The design intentions is that the said inlet should remove more than 90% but typically 99% or more of the liquid before the gas is introduced into the vessel. By removing the major part of the liquid the gas quality out from the vessel will be improved.

The new inlet section will treat the inlet mixture using centrifugal forces and will typically comprise:

An inlet distribution chamber that will distribute the mixture entering the vessel through the inlet nozzle into one or more treating devices for the fluid. The distribution chamber will also usually have an outlet that allows any liquid separated inside the distribution chamber to flow out into the vertical vessel.

one or more devices in parallel mounted onto the inlet distribution chamber for treating the gas liquid mixture typically comprising of
- a cylindrical tube;
- a swirl inducing element for setting the flow into rotating flow located close to the inlet section;
- an outlet opening downstream of the flow element for the substantially gas containing mixture part to exit the treating device;
- an outlet opening downstream of the flow element where the substantial liquid containing mixture part may exit the treating device usually lateral to the cylinder axis; and
- a collection chamber for the substantially liquid containing mixture part that collects this mixture and guide this underneath the inlet section of the vessel.

According to the invention the horizontal or vertical gravity vessel will contain an internal vessel that distributes the gas into a set of cyclones where the inlet fluid is set in rotation by means of a swirl-inducing device being outward delimited by the cyclone body so that the incoming fluid is exposed to a centrifugal force in addition to the gravity force. Most of the liquid will, because of the centrifugal force, be separated immediately towards the cyclone walls and follow the wall until it exits the laterally arranged openings. In some arrangements gas may be allowed to follow the liquid through the liquid openings as well. The mixture with predominately gas will exit the cyclone tube at the opposite end of the entrance with the swirl inducing element. The separator device as such is according to known technology, normally denoted as axial flow cyclones or demisting cyclones. The axial cyclones are well suited for a multiphase mixture that will consist of mainly gas. The gas will pass the tube in a single pass from the inlet to the outlet. This is unlike a reversible cyclone for gas where the gas exits at the top of the cyclone and exit at the top of the cyclone. The gas which is typically more than 97% of the volume in the feed will need to turn inside the cyclone before exiting the cyclone. Hence approximately half of the available flow area should ideally be used for the gas moving upwards in the cyclone and the half of the available flow area should be used for the gas moving downwards in the cyclone. For the axial flow cyclone the gas will utilize the full cross section flowing from the inlet at one side towards the outlet at the other side and will hence be better suited for a flow that mainly contain gas.

The inlet pipe into the vessel is connected to the inlet distribution chamber that distributes the gas and liquid into the vertically oriented cyclones tubes. Any liquid separated by gravity in the inlet chamber upstream the cyclone will be drained in a separate pipe from the inlet chamber. The cyclone tubes are designed as cyclones where the gas is set into rotation in a spin element at the entrance end and exits at the outlet of the other end of the cyclone. The gas flow will hence never be reversed as in reversible gas cyclones and this allows higher gas velocity in the axial flow cyclones. Liquid that hits the inner wall of the cyclone is drained through slits in the cyclone wall into outer liquid collector chambers. The liquid is then drained from the liquid collector boxes underneath the inlet section. The invention is further described with references in the following. The invention will separate gas from liquid using axial flow cyclones. The liquid and the gas will then be introduced as a predominately gas containing stream and a predominately liquid containing stream into the gravity separator at a common pressure. This is unlike other inlet types where the gas and liquid exits the vessel into different chambers with different pressure.

The present invention is aiming to utilize the best elements from each of the previously described separation technologies in order to achieve an efficient separator at higher gas flow rates. The invention is for a two stage separator where the separation occurs in two separate stages. The gas will hence pass two scrubbing stages where the first one removes the bulk of the liquid typically 98% or more and the second cleans out the liquid that remains in the gas typically more than 98% of the remaining liquid assuring a high efficiency. The present invention will address the issues with currently known technology and aim to be compact, have low pressure drop and will be able to combine the liquid streams from the 1st and 2nd treating stages inside the vessel. The pressure differences are all balanced out using downcomers and height differences between the individual elements.

The invention uses axial flow cyclones where the gas and liquid mixture enters the cyclone at one side and the gas leaves at the other side of the tube. The liquid will be extracted through the wall of the cyclone through openings designed to extract liquid from the gas stream. The advantage of using axial flow cyclones for scrubbing where the gas content typically is between 95% and 100% volumetric is that unlike reverse cyclones often used the gas will utilize the full body of the cyclone for separation and only make one pass through the cyclone. For the reverse flow cyclones the gas flow will first be downward in the cyclone before turning and exit the cyclone at the same end as the inlet.

The present inlet device is meant for multi stage scrubbers where the liquid is separated from the gas in several stages. The gas will hence be treated in several consecutive stages and there will be a pressure drop for each of these stages. The liquid separated in the different stages will have to be comingled even if the pressure in the vessel will vary through the vessel.

The usual scrubber design will have an inlet that does not do any separation. Then there is a vessel volume that does the bulk separation where a large part of the liquid is separated. The gas will pass a coalescing and flow distribution section that usually is either a mesh pad or a vane pack before the demister. The demister may be another mesh pad or it could be a vane pack or demisting cyclones that cause some pressure drop. In order to transport the liquid from the demister down into the liquid pad a pipe or so called downcomer is used. The downcomer extends from the demister section down into the liquid pad. The difference in pressure between the liquid collection chamber in the downcomer and the liquid pad in the vessel will be compensated by liquid being pulled up in the downcomer.

The invention will now be described in further detail with reference to drawings, which also show examples of the prior art technology.

BRIEF DESCRIPTION OF THE DRAWINGS

FIGS. 3A, 3B, 3C, 3D and 3E show the functional principle of axial flow cyclones that are used for separating in the new inlet section.

FIG. 3D' is a cross section of the axial flow cyclone of FIG. 3D taken along section line 3D'-3D'.

FIG. 3E' is a cross section of the axial flow cyclone of FIG. 3E taken along section line 3E'-3E'

FIG. 7B is a cross section of the vertical scrubber vessel of FIG. 7A taken along section line 7B-7B.

FIG. 7C is a detail view of the multi cyclone of FIG. 7A.

FIG. 7D is a cross section of the multi cyclone of FIG. 7C taken along section line 7D-7D.

FIG. 7E is a cross section view of the multi cyclone of FIG. 7C.

FIG. 7F is a cross section of the multi cyclone of FIG. 7C taken along section line 7F-7F of FIG. 7E.

FIG. 8A is a cross section view of a prior art scrubber using the extension of a horizontally oriented inlet pipe as a cyclone.

FIG. 8B is a cross section view of a prior art scrubber using the extension of a vertically oriented inlet pipe as a cyclone.

DETAILED DESCRIPTION OF THE PREFERRED EMBODIMENTS

Figures 1, 1A, 1B:
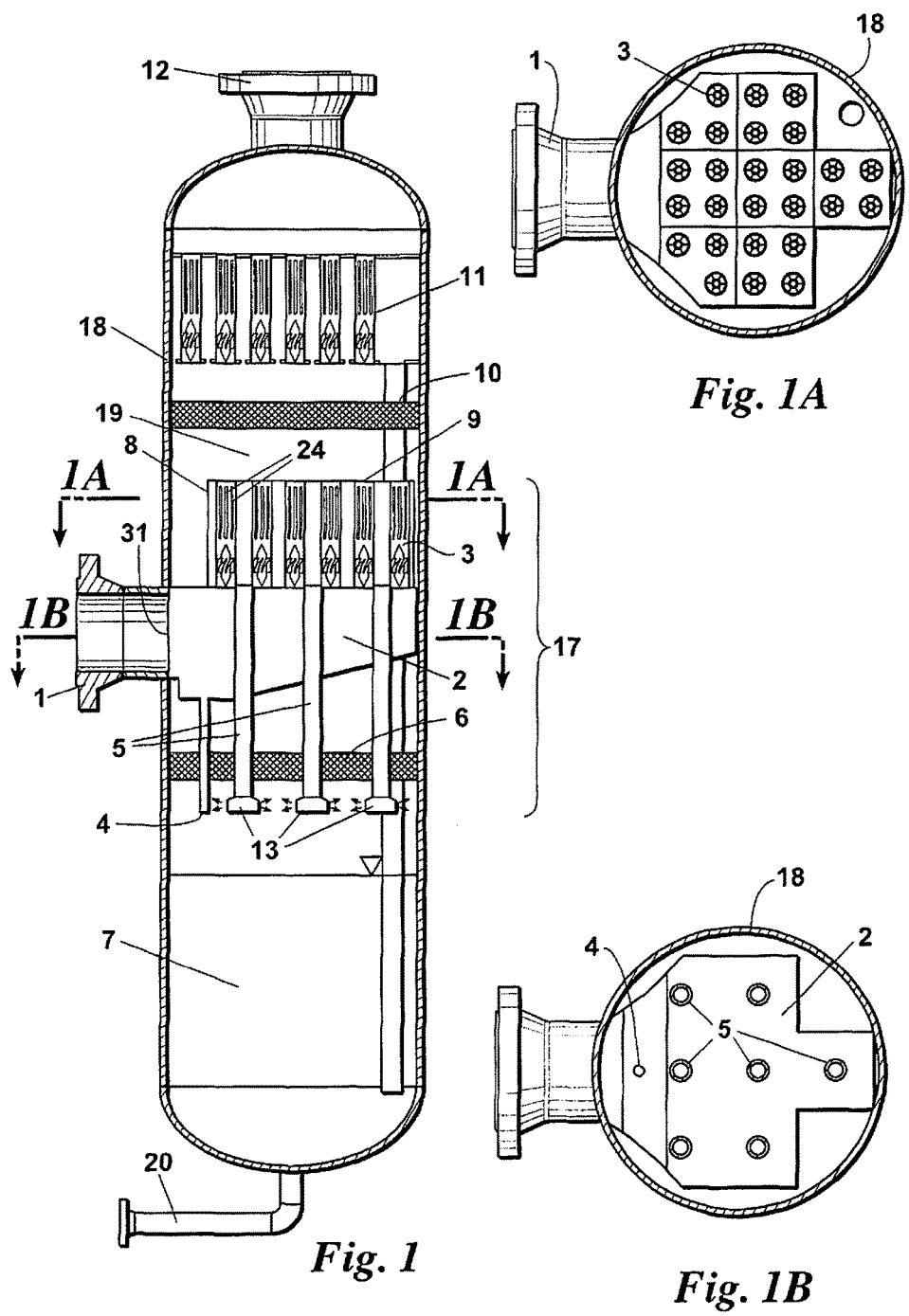
FIG. 1 is a schematic view of an embodiment of the present invention.
FIG. 1A is a cross section of the gas scrubber of FIG. 1 taken along section line 1A-1A.
FIG. 1B is a cross section of the gas scrubber of FIG. 1 taken along section line 1B-1B.

The present invention is an inlet device that will pre-separate liquid from the gas prior to the gas entering the gravity separator. The invention as installed in a gravity separator vessel is showed in FIG. 1. The gas and liquid enters the gravity separator through the inlet nozzle 1 and passes through inlet opening 31 of the inlet device according to the present invention and enters distribution chamber 2 that is used to distribute gas and liquid evenly into the cyclones 3 mounted on top of the inlet device. In FIG. 1 the axial cyclones 3 are mounted together in liquid collection chambers 8. The number of axial flow cyclones 3 in these chambers 8 varies. There might be some separation of liquid in the distribution chamber 2. This liquid that separates in the distribution chamber is transported out and below the inlet section through a liquid drain pipe 4. This will be a stream that contains liquid part of the liquid and the outlet of this pipe is extended underneath the distribution chamber 2 into the gravity vessel 19. The main bulk of gas will be transported through the axial flow cyclones 3 where the liquid is separated from the gas using centrifugal force.

One of the benefits of the current invention is the use of parallel elements for the separation. These elements will be small in dimension compared to the size of the vertical vessel. For large scrubbers with high gas load the adding of more cyclones in parallel for higher capacities will maintain the high efficiency that represents a challenge for separators relying on centrifugal force aiding separation when used in larger separator vessels.

The cyclone will separate the inlet mixture into a part that contains the major part of the liquid that will have an exit 5 underneath the inlet section. Since there is higher pressure in the cyclone liquid collection chamber 8 than in the vessel some gas might follow the liquid in the downcomer 5. There will be some gas associated with the liquid in liquid drain pipe 4 and downcomer 5. The amount of gas will typically be less than 20% of the total gas and the gas loading in underneath the inlet section will be low. The small amount of gas following the liquid underneath the inlet section will drop out by gravity and be polished in the mesh pad 6. The amount of liquid separated in the cyclones and transported underneath the inlet section will typically be more than 99% of the total liquid in the feed. Underneath the inlet section there will be a gas liquid mixture that typically contains less than 20% of the gas and 99% or more of the liquid in the inlet nozzle. The liquid will then be separated in the zone underneath the inlet section both by gravity and in the mesh pad 6 and fall down into the liquid pad 7 of the gravity separator before the liquid exits the vessel through the liquid outlet nozzle 20. The gas following the liquid underneath the inlet section will flow upwards past the inlet section and be mixed with the major part of the gas that comes out through the top of the cyclones and into the zone above 19. The gas flow that follows the liquid underneath the inlet section will typically contain 99% or more of the liquid while the amount of gas will typical represent less than 20% of the total gas flow. The liquid has to be separated from this slip stream of gas before being recombined with the gas exiting the top of the cyclones 9. The liquid that follows the gas on the underside of the inlet section will be separated in the space underneath the inlet section. The separation will be partly due to gravity. The gas loading underneath the inlet section be much lower than upstream of the inlet section since only typically 20% or less of the gas will exit through the downcomer 5. The low gas loading underneath the inlet section will reduce liquid entrainment. In addition the low gas loading will make this volume well suited for use of a traditional demister section to further clean up of the gas. This will typically be a mesh pad 6 but the demister might also be a vane pack for fouling services. The demister will assure that the gas that has followed the liquid underneath the inlet section is clean. The inlet section will typically be designed to achieve 99% or more separation efficiency.

The liquid that is separated out in the cyclones 3 is drained through the inlet device using downcomers 5. The downcomers 5 that extend through the inlet device will also act as mechanical support of the inlet device. The arrangement of the downcomers 5 underneath the inlet section may be arranged so that each of the downcomers is extended underneath the inlet device. The piping from the cyclones may also be gathered in manifolds from where one or more pipes are extended further down from such manifolds.

An option of letting the gas follow the liquid down underneath the inlet section is to let the downcomer 5 extend into the liquid pad 7 in the gravity separator. By extending the pipes into the liquid, the pipes will be sealed in the liquid pad and only liquid will flow in the downcomer pipe. The advantage of such a configuration will be that there will be no gas stream underneath the inlet section associated with the liquid stream through downcomer 5 that needs to be treated in the vessel.

For the case where the downcomers do not extend into the liquid pad one should preferably use a diffuser 13 on the end of each downcomer. The diffuser will reduce the momentum of the gas out from the pipes. In addition the diffuser should be designed so that the gas flow is directed to horizontally in the vessel and not downwards. The gas velocity out from the downcomer tube should not be directed directly towards the liquid pad in the vessel to minimize liquid re entrainment form the vessel.

An alternative to the described piping underneath the inlet chamber for the liquid rich stream out of the cyclones is one in which the liquid is allowed to flow freely out of the liquid collection chamber 8 through holes in the liquid collection chamber 8 out into the gravity separator 19. Because of the higher pressure in the liquid collection chamber 8 the liquid will contain some gas when entering the gravity separator 19. The liquid rich mixture from the liquid collection chamber 8 will then typically be drained to the top of the distribution chamber 2 rather than guided underneath the liquid section using the downcomers 5.

The flow out of the top of cyclones 9 will be mainly gas with traces of liquid. The gas that exits through the top of the cyclones will be mixed with the gas that exits with the liquid coming up around the inlet section. The gas will then be further treated to clean out the traces of liquid. Typically the gas will be treated in a mesh pad 10 to improve flow distribution and agglomerate the droplets into larger droplets before the gas flows into a demisting section here shown as axial flow cyclones 11 to remove the final traces of liquid in the gas stream before the treated gas exits the gravity separator vessel through the gas outlet nozzle 12. The advantage of the new inlet 17 is that it improves the gas quality in the vessel by removing the bulk of the liquid already in the inlet section. The overall liquid removed from the gas stream will be the sum of the liquid removed in the inlet and the liquid removed in the vessel and demister. By reducing the liquid loading on the vessel through separating liquid in the inlet the total amount of liquid carry over from the scrubber will also be reduced.

In order to control the amount of gas following the separated liquid from the axial cyclones, the liquid drain for the inlet device may be replaced by any pressure-resisting device, or axial flow cyclones that are located at the underside of the inlet chamber instead of the liquid drain pipe 4 from the distribution chamber 2. The cyclones replacing the drain pipe 4 may be similar to the cyclones directed upwards. Any liquid separated in the distribution chamber 2 by gravity will drain out through the cyclones on the underside of the chamber. The amount of gas treated by the cyclones that has a gas outlet in the underside of the inlet chamber will typically be less than for the cyclones that is directed upwards, but typically less than 20% of the total gas flow into inlet 1. The gas that is treated underneath the inlet chamber will have to pass the inlet section again on the way upwards increasing the gas load when the gas flow past the inlet section since the inlet section itself will displace some of the flow area available.

The inlet distribution chamber 2 is designed to assure that the inlet feed is evenly distributed to the multiple cyclones 3 mounted on the inlet chamber. The design of the inlet distribution chamber 2 reflects this where the inlet distribution chamber has a larger cross sectional flow area close to the inlet nozzle than further away from the inlet nozzle typically achieved by a sloped underside of the inlet distribution chamber, so that the inlet chamber is highest close to the inlet nozzle and has the lowest height at the opposite end of the inlet section. In addition there may be arranged vanes at the inlet to help spread the inlet fluid across the full cross section of the inlet distribution chamber to improve the flow distribution in the inlet chamber further.

The design of the inlet distribution chamber 2 may also take into account the drainage of solids from the chamber. For applications where the fluid contains large amounts of solids the design of the inlet distribution chamber 2 should be designed inclined bottom to assure no solids accumulation at the bottom of the inlet chambers. The plates should typically be tilted 45° or more towards the drain pipe 4 of the inlet distribution chamber to assure that solids will not accumulate in the bottom of the distribution chamber 2 but rather slide down through the drain pipe 4 helped by gravity.
Comparison with Prior Art Technology.

Figure 2:
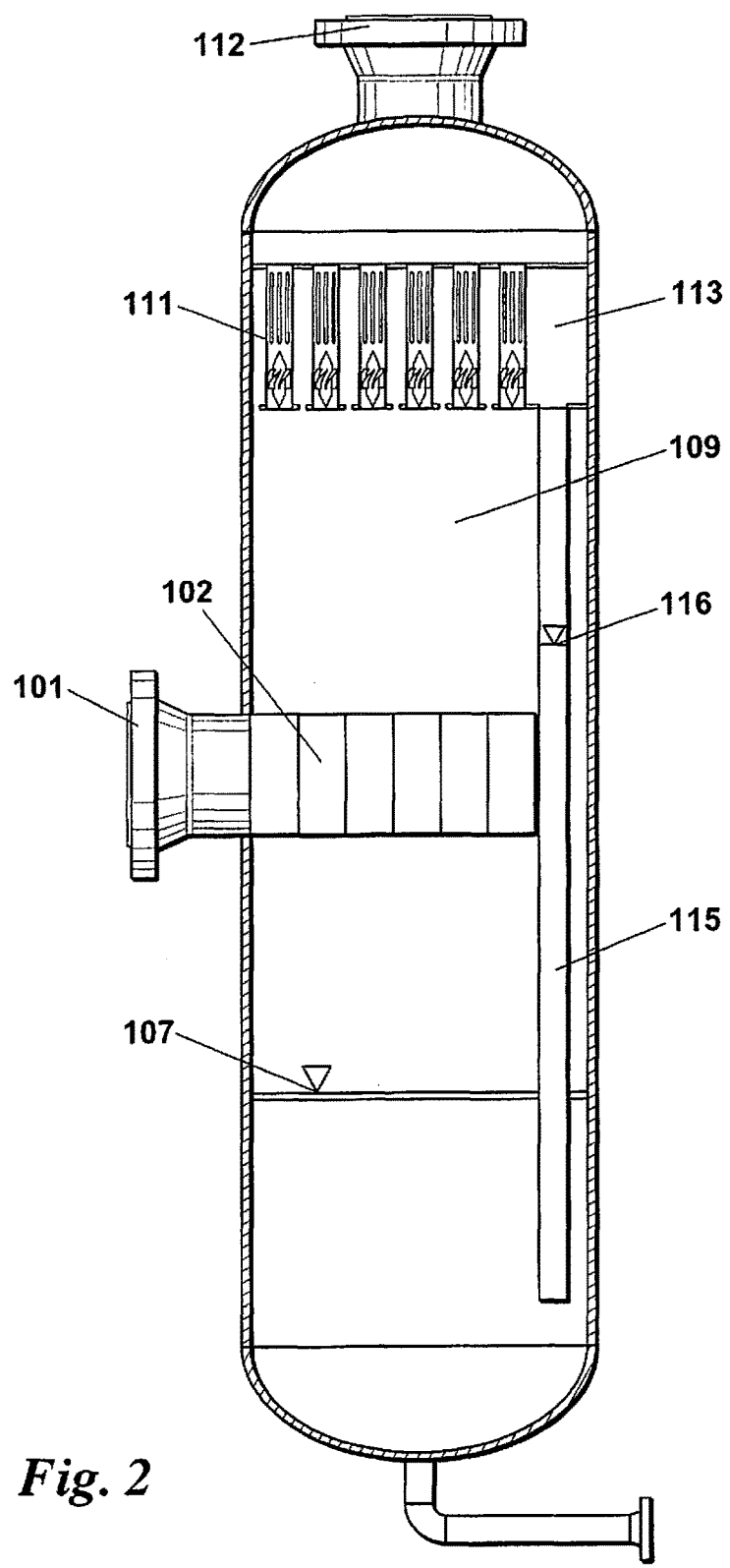
FIG. 2 is a cross-sectional view of prior art gas scrubber equipped with a vane diffuser inlet device, demisting equipment and internal drainpipe.

FIG. 2 shows a separator for removal of a mist of droplets according to known technology, comprising a vane diffuser inlet device 102 receiving the inlet gas from the inlet nozzle 101 as gentle as possible and distributing the gas and liquid mixture into the separation zone 109 evenly to utilize the vessel volume. In two stage gravity separators the zone 109 represents the 1st stage of separation where the liquid is separated from gas due to gravity. The separation efficiency will be a function of the amount of gas. The size of the vessel will then be decided to assure the scrubber efficiency by controlling the gas load in the vessel. Vane diffuser inlet devices are currently the preferred inlet device technology in gas scrubbers.

Gas passing through the separation zone 109 will typically contain many small and some medium size droplets entering the demisting equipment 111, here illustrated as axial flow cyclones, where further amounts of liquid is separated. Liquid separated by the demisting equipment 111 is collected in a chamber 113, and then drained through the downcomer 115. As earlier explained, the pressure on the downstream side of the axial flow cyclones will be lower than the pressure upstream the axial flow cyclones, and therefore the downcomer 115 has to be submerged in the liquid pad 107 to avoid gas flowing counter current with the liquid in the downcomer 115 due to the pressure difference. The liquid column pulled up in the downcomer 115 balances this pressure difference between chamber 113 and gravity separator zone 109. The liquid level 116 in the downcomer 115 will therefore be higher than level of the liquid pad 107 in the scrubber. The available height above the liquid level 116 is a design parameter with respect to dimensioning the gas scrubber. At too high gas flow rates relatively to the scrubber height, liquid will be sucked up into the chamber 113 and further into the gas outlet 112 which is critical for the operation.

Axial flow cyclones will be an integrated part of the current invention and several types of axial flow cyclones are known. FIG. 3a shows an example of an axial flowing cyclone of known category, i.e. described in patent applications PCT/NL97/00350, PCT/NL99/00677 and NL20001016114. The notion "axial cyclone" is due to fact that the main gas transport is in the longitudinal direction of the cyclone where the flow inlet is oriented at the opposite end of the gas outlet. There will be minimum one swirl-inducing element oriented towards the inlet side of the cyclone. Typically the cyclone will have slots or perforations in parts of the cyclone tube to allow the liquid phase to exit the cyclone laterally. Axial flow cyclones have successfully installed for high-pressure demisting applications because the low pressure drop and high separation efficiency. The axial flow cyclone 29 comprises a cylindrical pipe in which the gas is passing through. Inside the pipe a swirl inducing element 21 is arranged that comprises an axis symmetric concentric body with stationary vanes 22 that sets the gas stream in rotation into the separation chamber 23. Because of the gas rotational motion, liquid droplets will due to the density difference be thrown towards the wall of the cyclone tube 29. The liquid hitting the wall of the cyclone will form a thin liquid film that will be removed from the gas stream through the wall of the cyclone tube 29 through slots 24 arranged in the outlet end of the cyclone. The liquid will be collected in a drainage chamber 25 where the liquid is collected and drained through the downcomer 26 to the liquid section of the separator.

In FIG. 3b the cyclone is arranged as a recirculation type cyclone where a small flow of gas leaves the cyclone through the slots 24 before being re-introduced in the cyclone through the center of the swirl inducing element 21. This is done in order to aid the liquid passing though the slots 24 The gas purge stream is normally established to give a net flux of gas out from the slots in same direction as the liquid. This is obtained by connecting the drainage chamber 25 to the low-pressure area in center of the cyclone tube 29, through a channel 27 connected to the central hollow flow passage 28 in the swirl element or vane cascade 21. This purge gas is typically 2-10% of the total gas flow. The purge gas represents a loop from the separation chamber 23 out to the drainage chamber 25 and back to the separation chamber 23. The purge stream will also blow off liquid that follows the swirl inducing element 21 as a film.

FIG. 3c shows another variation of an axial flow cyclone used for that has no recirculation of gas from the liquid drainage chamber 25. The main gas flow enters the cyclone through the opening 20 and is set into rotation by swirl inducing element 21. The heavier liquid is thrown towards the wall of the cyclone tube 29 by centrifugal acceleration and forms a film on the inside of the cyclone. The liquid film is then removed from the cyclone wall by the slots 24 and is collected in the liquid drainage chamber 25. This is similar to the cyclones previously discussed and shown in FIG. 3a and FIG. 3b. The difference is that this version has a channel 30 through the swirl inducing element 21 where a small part of the gas in the inlet will pass. The channel 30 is preferably equipped with tangential inlets or guiding vanes to also put this stream in rotation. The small amount of gas that passes through the channel 30 is used to blow any liquid that follows the swirl inducing element 21 into the separation chamber 23.

The cyclones in FIG. 3 a, b, c may further be equipped with double curved vanes. The double curved vanes as described in patent WO 03039755 will give improved separation since the creep flow of liquid along the vanes will be forced towards the outer side of the vanes by their geometry. The double curved vanes will be configured to achieve higher tangential velocity close to the center of the cyclone than at the wall and thereby give a tangential velocity in the vessel that are similar to the free vortex set up by free rotating fluid streams governed by the conservation of angular momentum.

In FIG. 3d and FIG. 3e alternative swirl inducing elements are shown. In FIG. 3d a set of tangential guiding vanes 32 are used to set the flow in rotation. In FIG. 3e tangential port are used to set the flow in rotation. The functionality of the cyclones as shown in FIG. 3d and FIG. 3e is similar to the cyclones shown in Figures a, b, c downstream of the swirl inducing element.

Figure 4A:
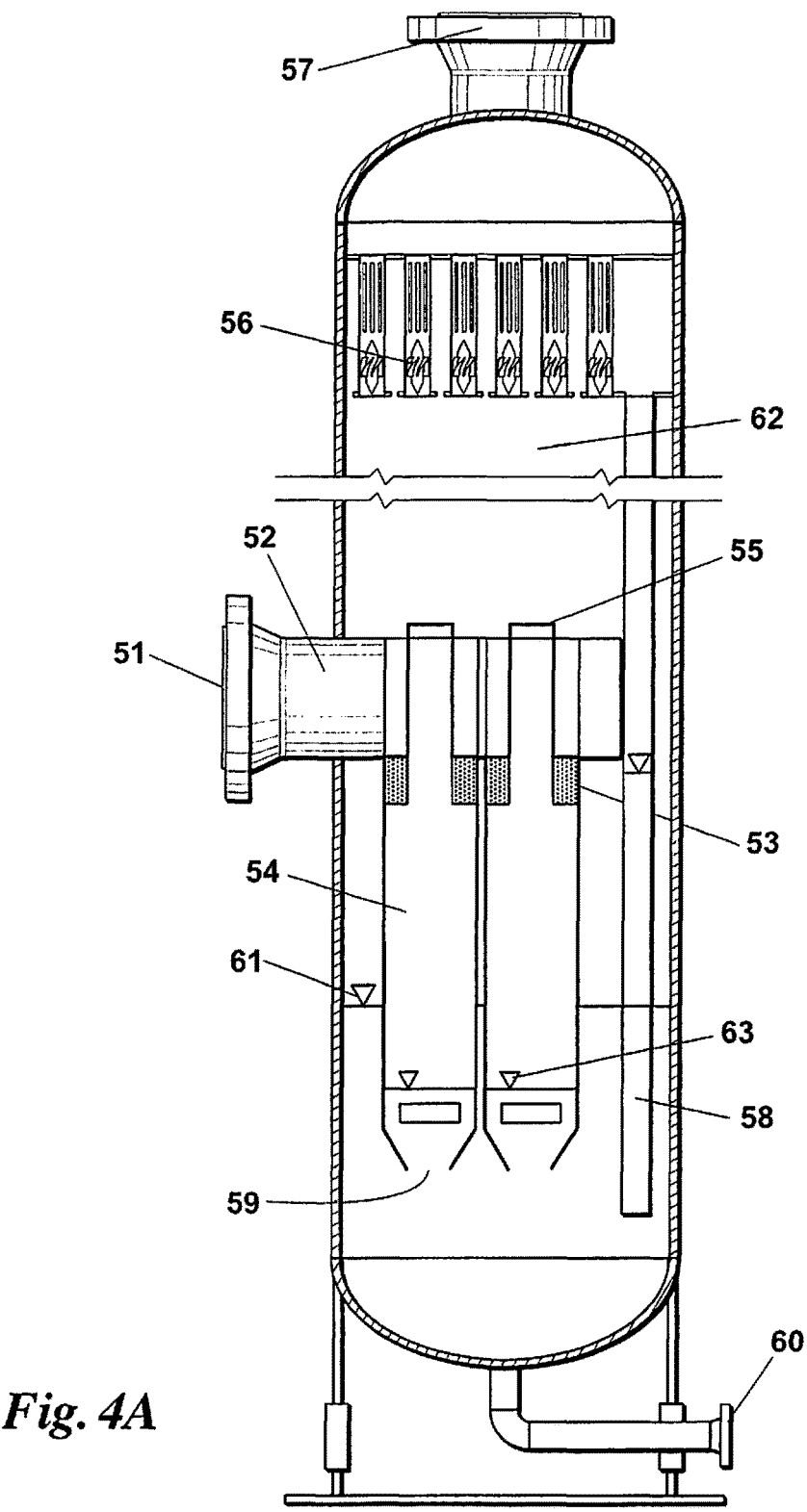
FIGS. 4 a-b show cross sectional views of prior art gas scrubber equipped with a cyclonic inlet device, demisting equipment and internal drainpipe.

FIG. 4a shows a cross sectional view of a former known gas scrubber equipped with a cyclonic inlet device, demisting equipment and an internal drainpipe as described in UK patent application GB2329857. This configuration is characterized by the connection between the inlet nozzle 51 and one or more cyclones through a distribution chamber 52. The cyclone tube has a swirl-inducing element 53 in order to turn the incoming fluid in rotation inside the cyclone tube 54. In FIG. 4a, the swirl-inducing element is shown as a vane cascade but the swirl could also be induced using one or tangential inlets on the cyclone. Most of the liquid is separated in the cyclone tube 54 by means of centrifugal forces downstream of the swirl inducing element 53, after which the rotational gas exits the cyclone tube 54 through a gas outlet pipe 55. Further droplet removal is done by axial flow cyclones 56 upstream the scrubber gas outlet 57. The liquid separated in the axial flow cyclones 56 is drained through one or more downcomers 58 back into the liquid pad of the vessel. Liquid separated in the cyclone tube 54 will drain along the inner wall of the cyclone tube 54, and guided through the liquid outlet 59 of the cyclone. The liquid level 61 in the separator is normally controlled by a valve on the separator liquid outlet 60.

A substantial disadvantage utilizing this kind of cyclonic inlets is the risk of gas breakthrough in the cyclone tube liquid outlet 59. Because of the pressure drop from outlet of the swirl inducing element 53 to the top of the gas outlet pipe or vortex finder 55, the pressure at the liquid surface 63 inside the cyclone will be higher than the pressure at the liquid surface 61 at the separators deposition zone 62. If the pressure drop is too high, the liquid surface 63 inside the cyclone tube 54 will be forced down to the cyclone tube liquid outlet 59, and gas will be blown out of the liquid outlet, causing foaming and subsequently liquid entrainment to the scrubber gas outlet nozzle and gas-contaminated liquid in the liquid outlet. From this situation, the whole scrubber may "collapse". The pressure drop across the gas outlet is caused by the velocity increase when the gas passes swirl inducing element or vane cascade 53 outlet to the gas outlet 55. The velocity increase has two reasons; i) the gas gets a high axial velocity when it is forced through the gas outlet pipe 55) and ii) the rotational component of the gas will, due to conservation of rotational momentum increase because the gas is forced into a smaller diameter. The latter effect explains why the "ice-ballerina" increases her rotational velocity when she pulls her arms towards her body. According to the law of conservation of momentum (Bernoulli's equation), the total velocity increase will thus require a drop in the pressure (pressure in deposition zone 62 is lower than the pressure inside the cyclone tube 54. Increased gas flow rates thus gives increased total velocity and consequently increased pressure drop.

Another disadvantage is the utilization of the flow volume in the cyclone. Because of the geometrical layout of the cyclone where the gas outlet is located at the same end as the inlet of the cyclone the gas has to flow downward in the cyclone tube 54 where the gas liquid separation occurs. After separation of liquid from the gas the clean gas flows opposite direction though the gas outlet pipe 55. If the gas outlet pipe 55 represents 50% of the flow area in the cyclone the area outside the gas outlet will be the other 50%. Hence the gas velocity in the cyclone will be at least twice of the axial cyclone as shown in FIG. 3 a-e where the inlet and outlet is located at each side of the cyclone tube. The increased gas velocities inside the cyclone will give increased pressure drop and reduced separation performance.

Another disadvantage by utilizing the cyclonic inlet device as shown in FIG. 4a is the difficulty of establishing a practical arrangement of the distribution chamber 52, particularly in cases where the separator internals have to be replaceable. In those cases a bolted connection has to be made between the distribution channel, the separator wall and the cyclone tubes, causing limitations to the cyclone tube diameter and/or numbers of cyclone tubes that can fit into the vessel. If the cyclone tube does not have to be replaceable, the distribution chamber 52, which then should be cylindrical, is welded to the separator wall.

The last disadvantage of the cyclone as illustrated in FIG. 4*a* is that it will give considerable liquid carry-over from the gas side of the cyclone. It is hard to achieve two clean sides from cyclones and it is usually prioritized to get a clean liquid side. The result is that the gas side will be quite contaminated.

Figure 4B:
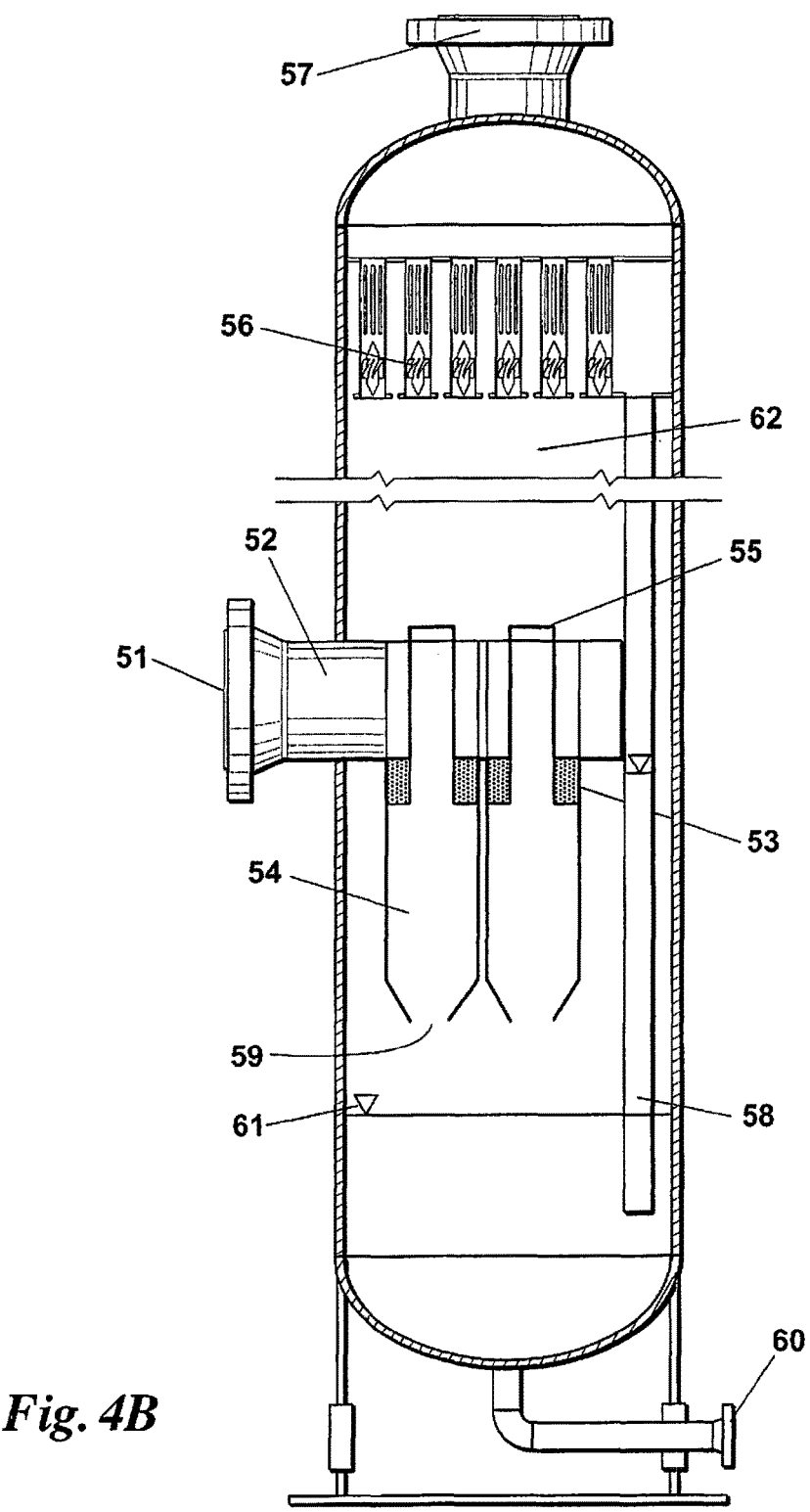

FIG. 4*b* shows a variant of this technology where the liquid outlet 59 of the cyclone is not submerged. The advantage is that this cyclone will not give gas carry-under into the liquid pad inside the vessel. The disadvantage is that the liquid outlet will contain gas that has to be treated in the lower part of the vessel. The other disadvantage is the relatively long distance needed beneath the inlet for the cyclone which requires a tall vessel.

Figure 5:
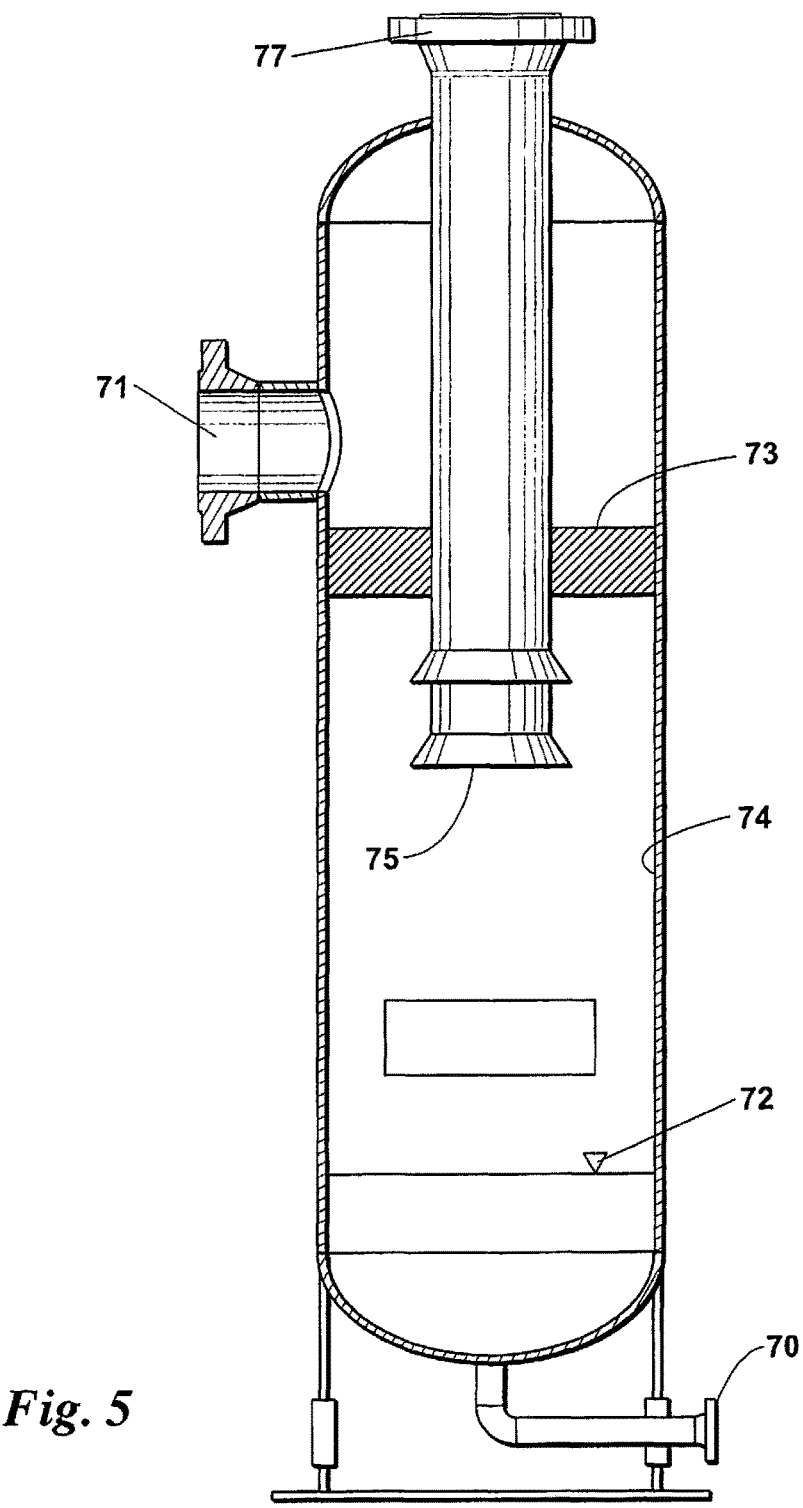
FIG. 5 shows a cross sectional view of a prior art single-stage cyclonic scrubber.

FIG. 5 shows a cross sectional view of former known single-stage cyclone-separator, which for instance is described in Norwegian patent NO175569. Such configuration is characterized by that the liquid separation takes place in one single stage, and that the pressure vessel represents the cyclone tube. Principally, the cyclone separator shown in FIG. 5 is similar to the inlet cyclone shown in FIG. 4*a*, but here the gravity vessel wall 74 is used as the cyclone body. The separator has a swirl-inducing element 73 setting the incoming fluid in swirling motion. The liquid is separated in the cyclone separator by centrifugal forces downstream of the swirl inducing element 73. The clean gas then turns and flows through the gas outlet 75, which is connected to the gas outlet nozzle 77 of the separator. No further droplet removal is made and this is hence a single stage scrubber vessel. Liquid separated in the cyclone separator is drained along the cyclone separators inner wall 74 and carried out through the cyclone separators liquid outlet nozzle 70. The advantage with such an arrangement compared to inlet cyclones is the elimination of problems related to gas carry-under because liquid level 72 in the cyclone separator is directly measured and controlled. The disadvantage with the arrangement is less separation efficiency because downstream droplet removal equipment is not present. The patent describes a single cyclone that will have a diameter similar to the vessel diameter. There is an also outlined solution used inside the vessel where there is one unit that is located in the extension of the inlet pipe and that uses the pipe as the outer perimeter for the vessel. This is unlike the current patent that uses a distributor chamber upfront the axial cyclones. The use of a distribution chamber and multiple axial cyclones will have several advantages compared to a single cyclone. The efficiency of the cyclone will be a function of the cyclone diameter and the gas loading. A cyclone is based on the increased acceleration in a rotational separation field. The acceleration is expressed as $$a = \frac{w^2}{r}$$

where a is the acceleration in m/s, w is the tangential velocity and r is the radii. Hence to maintain a high centrifugal acceleration and driving force for the separation one has to increase the tangential velocity when increasing the radii of the cyclone. The higher velocity will increase the shear imposed on the liquid film from the gas inside the cyclone. This will increase the liquid re entrainment and the efficiency as function of gas load will decrease with increasing gas load or velocity. If such a single cyclone is to be scaled as well with respect to radii the length of the cyclone will increase linearly with increasing radii and the length of the cyclone being typically 5-10 times the diameter of the cyclone the length of the cyclone will soon be a problem for the vessel. The present invention provides an optimal relation between gas load and velocities in the cyclones since the cyclone elements will be designed similar for all low rates. When the gas flow rates increases, the number of cyclones in parallel will be increased.

Figure 6:
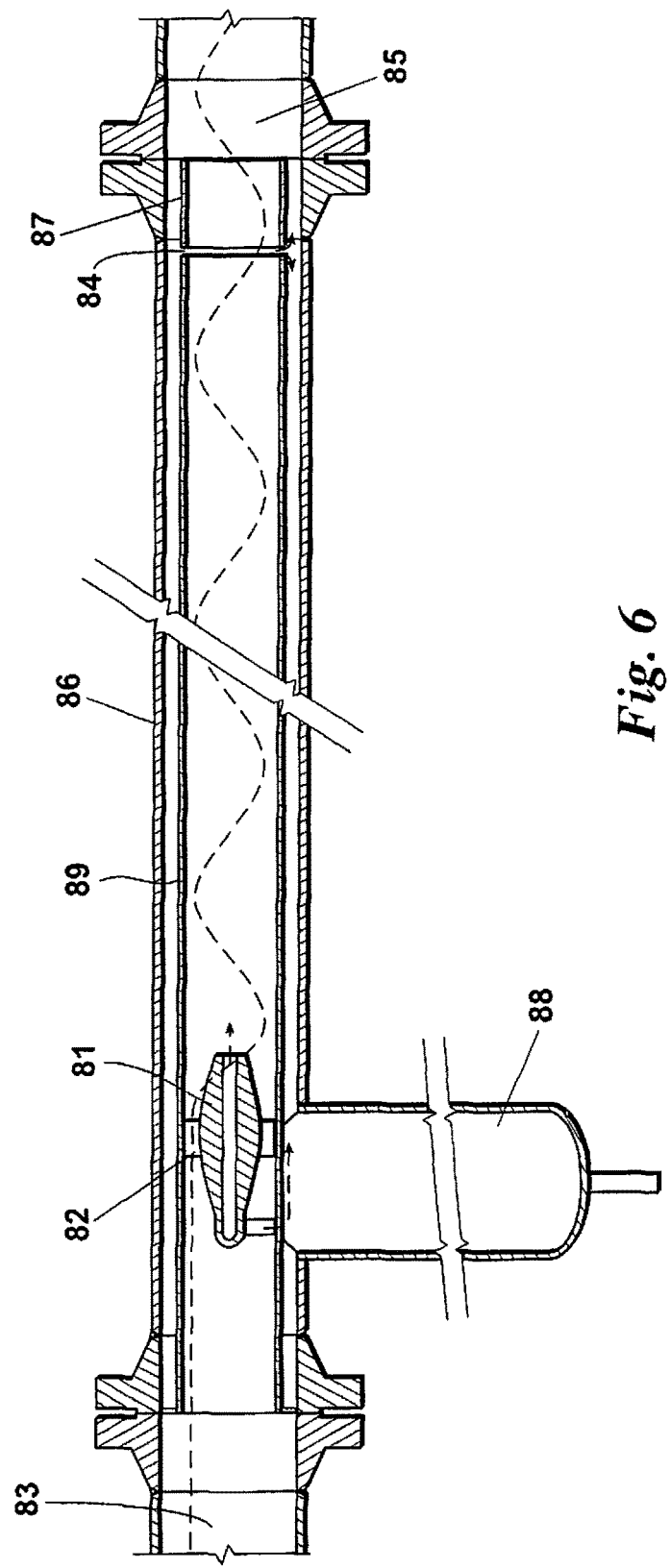
FIG. 6 shows a cross sectional view of a prior art single stage inline scrubber.

FIG. 6 shows an example of a formerly known cyclone described in GB1233347A. The gas enters the cyclone at the end and is set into rotation in the swirl inducing device. The swirl inducing element consists of a hollow hub 81 and vanes 82 that extend between the said hub 81 and the cyclone wall 89. The rotational velocity of the gas moving inside the cyclone creates a centrifugal field that forces the heavier liquid particles out towards the cyclone wall. The liquid that hits the outer wall will be gathered and form a film. At the end of the cyclone tube there is a gap 84 where this liquid film is allowed to flow out into the annulus between the vessel wall 86 and the cyclone wall 89. A small percentage of the gas is also allowed to follow the liquid out and will be recirculated in the center of the cyclone through the center of the swirl inducing hub 81 through the gap 84. The gas is introduced into the center of the cyclone where the pressure is low due to the rotational flow. The liquid will flow in the annulus and be collected in the liquid collection chamber. The gas leaves the cyclone through an inserted pipe section 87 often referred to as a vortex finder. The layout as shown in FIG. 6 is often referred to as a single stage scrubber since the gas is separated in one single stage.

FIG. 7 shows an example of formerly known multi cyclone inlet i.e. described in U.S. Pat. No. 2,372,514. The inlet fluid containing gas, fluids and possible solids enters the vessel through inlet nozzle 91 into the distribution chamber 92. The gas is separated from the liquid and solids in the multi cyclones 93 and the gas is gathered in the gas compartment 99 above the cyclones before exiting through the gas outlet nozzle 97. The liquid and solids falls down into the liquid compartment 94 of the vessel where the liquid and solids are removed through nozzle 90. The solids may be removed in separate flushing lines if it settles in the bottom of the vessel. The separation of gas and liquid will be in the cyclones and the pressure in the inlet distribution chamber 92, the gas compartment 99 and the liquid chamber 94 will be different and these are physically separated. This separator will also rely on single stage separation there will be no need to comingle streams inside the vessel as for two stage scrubbers.

Figure 7A:
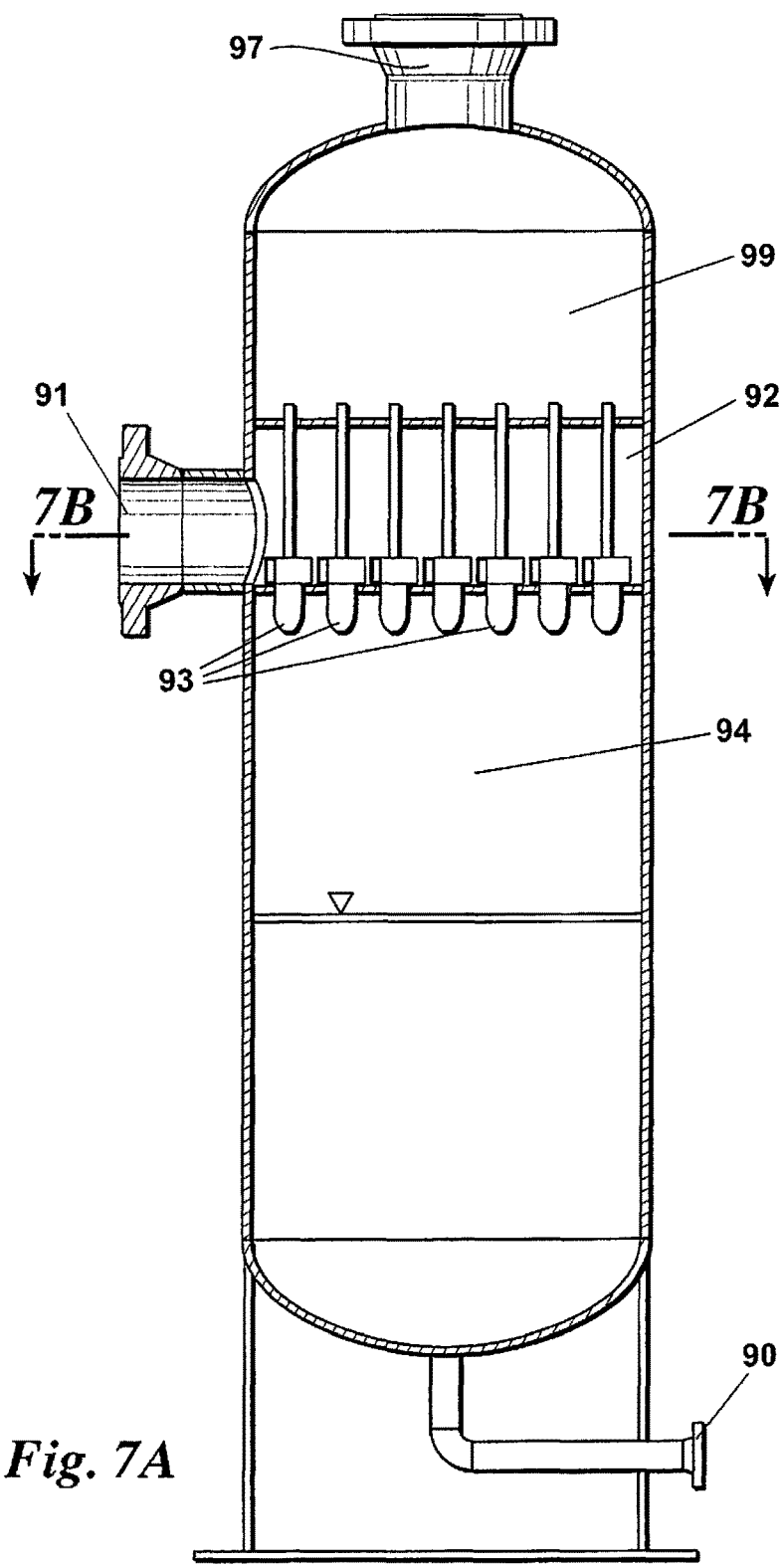
FIG. 7A is a cross sectional view of a prior art multi cyclone scrubber inlet arranged in a vertical scrubber vessel.

A detail of a multi cyclone 93 in FIG. 7*a* is shown in detail in FIG. 7*c*. The flow enters through the tangential inlet 95. The gas, liquid and solids are set into rotation through the inlet ports 95. The liquid is thrown towards the cyclone body 96 while the gas migrates towards the center of the cyclone and leave through the gas outlet 97 often referred to as a vortex finder. The cyclone body 96 will often have a conical section towards the liquid outlet 100. The conical shape of the liquid outlet will help transport liquid out of the cyclone. The rotational field inside the cyclone creates a centrifugal acceleration usually several decades higher than gravity acceleration. The high centrifugal field will set up pressure gradients that are oriented radially with respect to the cyclone axis. Any liquid film on the inside of the cyclone in the conical section will then be transported by the pressure gradients towards the center of the cyclone and the liquid outlet 100. The main challenge using the multi cyclone inlets are the high pressure drop. The high pressure drop is caused by the layout of the cyclone itself being a reversed cyclone. The gas enters the cyclone at the middle and move downwards in the cyclone body 96 before it turns upwards though the vortex finder 97. The pressure drop in the cyclone will occur when the gas is accelerating through the small vortex finder 97. There will both be an acceleration axially but also tangentially due to conservation of angular momentum. In the multicyclone layout as shown in FIG. 7 the high pressure drop will be handled by physically separating the separator into three volumes. The pressure in the inlet section 92 will be higher than the pressure in the liquid compartment 94 that will be higher than the pressure in the gas compartment 99. The high pressure drop will also represent a challenge with respect to the separation performance. Separation efficiency will be a balance between the separation due to centrifugal acceleration and re entrainment and droplet break up due to viscous drag. The high pressure drop indicates high viscous drag and reduced efficiency.

FIG. 8 shows an example of a formerly known inlet section that uses the inlet pipe as cyclone as described in i.e NO321170. Here the inlet section is mounted as an extension of the inlet pipe. The number of cyclones and orientation will hence be limited by the piping layout. The cyclone performance will be a balance between necessary centrifugal accelerations to assure droplet separation and the pressure drop you can accept across the device. An high pressure drop across the unit will reduce the efficiency due to increased shear on the liquid film inside the cyclone.

The centrifugal acceleration will generally be described by $a=w^2/r$ where v is the tangential velocity and r is the radii. While the pressure drop generally may be described as $p=\frac{1}{2}\xi\rho u^2$ where $\xi$ is a loss factor mainly dependent on w, $\rho$ is the gas density and u is the axial velocity. The inlet section is a static swirl element that sets the incoming gas in rotation and the tangential velocity will be directly proportional to the axial velocity. Hence in order to achieve similar centrifugal acceleration in a large radii cyclone and a small radii cyclone one has to increase the velocity and thereby the pressure drop across the cyclone.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

What is claimed:

1. A separator (18) for separating a fluid mixture comprising gas and liquid, a first stage of separation including an inlet device (17) to the separator (18), the separator comprising:
   a distribution chamber (2) connected to an inlet opening (31) for distributing the fluid mixture to one or more axial cyclones (3) constituting an integral part of the inlet device (17) and being connected to the distribution chamber (2), the one or more axial cyclones (3) being provided with an outlet opening (9) for a gas rich fluid stream and one or more openings (24) to allow liquid to leave the axial cyclones (3) and to pass into a liquid collection chamber;
   a liquid pad (7) located below the inlet device (17) and in communication with the outlet opening (9) and the one or more openings (24) so that the liquid leaving the axial cyclones (3) is drained to the liquid pad (7) and a liquid separating from the gas rich fluid stream of the outlet opening (9) is also drained to the liquid pad (7); and
   a demisting device (6) below said distribution chamber; and
   a downcomer for draining fluid from the liquid collection chamber to a location underneath said distribution chamber, said downcomer passing through said demisting device to a location below said demisting device;
   a liquid drain pipe (4) arranged to drain liquid-rich fluid from the distribution chamber (2) to the liquid pad (7);
   wherein said demisting device for further demisting fluid drained through the liquid drain pipe (4) and/or downcomer (5) after which a fluid is allowed to pass upwards outside the distribution chamber (2).

2. A separator as claimed in claim 1, where diffusers (13) are arranged on a lowermost end of the downcomers (5) or the liquid drainpipe (4) to reduce gas momentum, the lowermost end being located above the liquid pad (7) of the separator (18).

3. A separator as claimed in claim 1 wherein the one or more axial cyclones (3) are arranged in groups, having a common liquid collection chamber for each group.

4. A separator as claimed in claim 1 wherein the distribution chamber (2) is adapted to the separator (18) in which it is to be used so that a horizontal cross-section of the distribution chamber (2) covers between 65% and 90% of a horizontal cross-section of the separator (18).

5. A separator as claimed in claim 1 wherein all upwards openings from the distribution chamber (2) are connected to said one or more axial cyclones (3).

6. A separator as claimed in claim 1 wherein downcomers (5) are extended into the liquid pad (7), sealing the downcomer from transporting gas underneath the inlet device (17).

7. A separator as claimed in claim 1 wherein the liquid drain pipe (4) extends into the liquid pad (7), sealing the liquid drainage from transporting gas underneath the inlet device (17).

8. A separator as claimed in claim 1 wherein diffusers (13) are arranged on a lowermost end of a downcomer (5) or the liquid drainpipe (4) to reduce gas momentum, the lowermost end being located above the liquid pad (7) of the gravity separator (18).

9. A separator comprising an inlet device being arranged as a first stage of separation in the separator, the inlet device comprising:
   a distribution chamber having an inlet opening arranged for receiving a liquid-and-gas mixture;
   one or more axial cyclones mounted to the distribution chamber;
   a liquid pad located below the distribution chamber and arranged to receive liquid from a liquid-rich stream exiting one or more sidewall openings of the axial cyclones as well as liquid separating from a gas-rich stream exiting a top outlet end of the axial cyclones; and
   a demisting device (6) below said distribution chamber;
   a downcomer for draining fluid from a liquid collection chamber, said downcomer passing through said demisting device to a location below said demisting device;
   a liquid drain pipe arranged to drain liquid-rich fluid from the distribution chamber to the liquid pad
   wherein said demisting device for further demisting fluid drained through the liquid drain pipe (4) and/or downcomer (5) after which a fluid is allowed to pass upwards outside the distribution chamber (2).

10. A separator as claimed in claim 9 wherein said downcomer or the liquid drain pipe are arranged to extend into the liquid pad of the separator.

11. A separator as claimed in claim 9 wherein the one or more axial cyclones of the inlet device are arranged in groups, having a common liquid collection chamber for each group.

12. A separator as claimed in claim 9 wherein the distribution chamber is adapted to the separator vessel in which it is to be used so that a horizontal cross-section of the distribution chamber covers between 65% and 90% of a horizontal cross-section of the separator.

13. A separator as claimed in claim 9 wherein all upward openings from the distribution chamber are connected to the one or more axial cyclones of the inlet device.

14. A separator comprising an inlet device being arranged as a first stage of separation in the separator, the separator comprising:

a liquid pad located below an inlet distribution chamber, the distribution chamber including axial cyclones, the liquid pad arranged to receive liquid from a liquid-rich stream exiting one or more sidewall openings of the axial cyclones as well as liquid separating from a gas-rich stream exiting a top outlet end of the axial cyclones; and a liquid drain pipe arranged to drain liquid-rich fluid from the inlet distribution chamber to the liquid pad;

a demisting device (6) below said distribution chamber;

a downcomer for draining fluid from a liquid collection chamber, said downcomer passing through said demisting device to a location below said demisting device;

wherein said demisting device for further demisting fluid drained through the liquid drain pipe (4) and/or downcomer (5) after which a fluid is allowed to pass upwards outside the distribution chamber (2).

* * * * *